(12) United States Patent  
Johnson et al.

(10) Patent No.: US 7,708,887 B2
(45) Date of Patent: May 4, 2010

(54) COMBINATION MEMBRANE/BIOLYTIC FILTRATION

(75) Inventors: Warren Thomas Johnson, New South Wales (AU); Bruce Gregory Biltoft, New South Wales (AU); Dean Osman Cameron, Queensland (AU)

(73) Assignee: Siemens Water Technologies Corp., Warrendale, PA (US)

( * ) Notice: Subject to any disclaimer, the term of this patent is extended or adjusted under 35 U.S.C. 154(b) by 11 days.

(21) Appl. No.: 12/092,755

(22) PCT Filed: Nov. 8, 2006

(86) PCT No.: PCT/AU2006/001666

§ 371 (c)(1),
(2), (4) Date: May 6, 2008

(87) PCT Pub. No.: WO2007/053890

PCT Pub. Date: May 18, 2007

(65) Prior Publication Data

US 2008/0290025 A1 Nov. 27, 2008

(30) Foreign Application Priority Data

Nov. 8, 2005 (AU) .............................. 2005906191

(51) Int. Cl.
*C02F 3/02* (2006.01)

(52) U.S. Cl. ................... 210/614; 210/617; 210/631; 210/104; 210/151; 210/257.2

(58) Field of Classification Search ............... 210/614, 210/615, 617, 631, 650, 741, 744, 104, 106, 210/150, 151, 257.2, 258, 259

See application file for complete search history.

(56) References Cited

U.S. PATENT DOCUMENTS

| | | | | |
|---|---|---|---|---|
| 3,472,765 A | * | 10/1969 | Okey et al. | 210/195.2 |
| 5,633,163 A | * | 5/1997 | Cameron | 210/617 |
| 5,961,830 A | * | 10/1999 | Barnett | 210/151 |
| 6,001,254 A | * | 12/1999 | Espenan et al. | 210/650 |
| 6,007,712 A | * | 12/1999 | Tanaka et al. | 210/151 |
| 6,383,369 B2 | * | 5/2002 | Elston | 210/150 |
| 2003/0192825 A1 | | 10/2003 | Chang et al. | 210/483 |
| 2004/0079701 A1 | | 4/2004 | Horng et al. | 210/636 |
| 2006/0081534 A1 | * | 4/2006 | Dimitriou et al. | 210/631 |

FOREIGN PATENT DOCUMENTS

| | | |
|---|---|---|
| EP | 1 647 530 A1 | 4/2006 |
| WO | WO2005/100264 A2 | 10/2005 |

OTHER PUBLICATIONS

International Search Report dated Jan. 8, 2007 for Application No. PCT/AU2006/001666.
International Report on Patentability dated Dec. 11, 2007 for Application No. PCT/AU2006/001666.

* cited by examiner

*Primary Examiner*—Christopher Upton

(57) ABSTRACT

Described herein are methods and systems for combination membrane/biolytic filtration. In one embodiment a filtration system is operated under suction. The arrangement includes a feed tan (5) having a smaller filtrate vessel (6) positioned therein. The region within, the feed tank (5) not occupied by the filtrate vessel (6) is partially filled with layers of decomposing and decomposed solid organic waste material to form an aerobic filter bed (7) of the type used in biolytic filtration as described above. A further module vessel (8) is mounted within the filtrate vessel (6) to form a membrane chamber (9) containing a membrane filtration module (10).

21 Claims, 12 Drawing Sheets

COMBINATION MEMBRANE/BIOLYTIC FILTRATION

TECHNICAL FIELD

The present invention relates to wastewater treatment and, more particularly, to the combination of biolytic filtration with a membrane filtration system.

BACKGROUND OF THE INVENTION

Domestic wastewater treatment systems are a common method of dealing with household waste in areas without sewer connections. This usually involves on-site disposal of the treated or partially treated effluent. Recycling of water from these systems for use in the home, whilst highly desirable, has been hampered by the variable quality of the treated effluent and difficulty of ensuring safe water for reuse.

A typical biolytic filtration system is described in U.S. Pat. No. 5,633,163. The biolytic filtration system comprises simultaneously treating wastewater and solid organic waste within a common filter bed having a top, a bottom, and a continuum of layers of decomposing and decomposed solid organic waste. The degree of decomposition of the solid organic waste in the filter bed increases from the top of the filter to the bottom with there being complete decomposition of the solid organic waste at the bottom of the bed. The filter bed incorporates a supply of living organisms which maintain the filter bed in an air and liquid permeable condition. Wastewater and solid organic waste are applied to the upper layer of the filter bed so that the wastewater percolates through the filter bed. The filter bed is maintained in an aerobic condition and treated wastewater is drawn from the bottom of the filter bed in a substantially purified state. Adding a membrane to the treatment process can greatly improve the water quality and provide pathogen removal, making reuse a viable option.

As the filtration system is likely to be used in a domestic situation or in a remote isolated area, it is desirable to provide a membrane filter which is integrated inside the treatment tank making it compact and is self-backwashing, without the need for sophisticated controllers, valves and timers. The control operations of the system are desirably performed by simple components such as hydraulic and non-return valves and pumps with the only controls required being float or level switches to control the pump operation. Further, given the limited opportunity to effectively dispose of backwash waste in domestic situations, it is desirable that backwash waste be further treated by recycle back to the filter bed.

DISCLOSURE OF THE INVENTION

It is an object of the present invention to overcome or ameliorate at least one of the disadvantages of the prior art, or to provide a useful alternative.

According to one aspect the present invention provides a wastewater treatment system including
  a) a biological treatment component;
  b) inlet means for supplying wastewater to said biological treatment component;
  c) a membrane filter device including one or more hollow, permeable membranes with a feed side in fluid communication with said biological treatment component;
  d) pump means coupled to said membrane device and being selectively operable to provide a filtration operation by producing a pressure differential across the walls of said membranes to cause flow of feed liquid from the biological treatment component to the feed side of the membrane walls and withdrawal of filtrate liquid from the filtrate side of said membrane walls.

Preferably the biological treatment component is an aerobic compost bed.

Preferably, the system further includes a filtrate vessel for receiving filtrate liquid withdrawn from the filtrate side of said membranes. For preference, the system includes valve means in fluid communication with said pump means for reversing the pressure differential applied to said membrane walls and producing a backwash of the membranes by flowing filtrate liquid from the filtrate side of the membrane wall to the feed side of the membrane wall.

Preferably, the valve means includes a pressure responsive valve, said pressure responsive valve being responsive to fluid pressure being applied to a control port to close. For preference, an inlet of the pressure responsive valve is connected to an outlet of said pump means, an outlet of the pressure responsive valve is coupled to said membrane device and the control port is coupled to the outlet of said pump means. Preferably, the valve means further includes a directional control valve having a first and second port and an outlet port wherein the valve is responsive to the fluid pressure at the first port being higher than that at the second port to allow fluid flow from the first port to the outlet port while closing the second port and being responsive to fluid pressure at the second port being higher than that at the first port to allow, fluid flow from the second port to the first port while closing the outlet port. For preference, the directional control valve is positioned between the pressure responsive valve and the membrane device with the outlet of the pressure responsive valve being connected to the second port, the membrane device being connected to the first port and the outlet port being in fluid communication with the filtrate vessel.

In one preferred aspect, the filtrate vessel is closed and the pump means is operable to withdraw filtrate therefrom such that said withdrawal produces said pressure differential across said membranes walls. Preferably, the filtrate vessel is selectively closed by a gas stop valve which allows gas to be vented from the vessel but prevents entry of gas into the vessel.

In one mode of operation of the system, during the filtration operation the pressure responsive valve is closed causing the fluid pressure at the first port of the directional control valve to exceed that at the second port as fluid pressure within the filtrate vessel drops. This results in filtrate from the membrane device flowing through the first port and outlet port of the directional control valve into the filtrate vessel. The pump means is disabled when the feed liquid level in the aerobic compost bed falls below a predetermined level. This results in pressure being released from the control port of the pressure responsive valve and the valve opening. When the pump means is re-enabled the pressure responsive valve remains open initially until sufficient pressure builds at the control port to close the valve. During this initial open period the fluid pressure applied by the pump means to the second port of the directional control valve exceeds the pressure at the first port resulting in the outlet port being closed and filtrate liquid flowing back to the membrane device from the filtrate vessel through the second and first ports of the directional control valve. This produces a backwash of the membrane device.

In another preferred aspect, the pump means is operable to provide feed liquid under pressure to the feed side of said membranes to produce said pressure differential across the membrane walls. In this aspect, a further pump means may be provided to reverse the pressure differential applied to said membrane walls and produce a backwash of the membranes by flowing filtrate liquid from the filtrate side of the membrane wall to the feed side of the membrane wall.

Preferably, the aerobic compost bed is formed in a feed vessel and said membrane device is in fluid communication with an inlet at or adjacent the base of said feed vessel. For preference, said feed vessel includes a fluid level detection device operable to control the operation of said pump means dependent on the level of liquid in said feed vessel. Preferably, said fluid level detection device is operable to disable the pump means when the liquid level falls below a first predetermined limit and to enable the pump means when the liquid level rises to a second predetermined limit. The first and second predetermined limits may be the same. Preferably, the first predetermined limit is selected to ensure the inlet at or adjacent the base of the feed vessel remains immersed in liquid. For preference, the inlet includes a foot valve.

According to another aspect, the present invention provides a method of treating wastewater including the steps of:
 a) forming and maintaining an aerobic compost bed;
 b) feeding wastewater onto the aerobic compost bed;
 c) causing said wastewater to filter through the aerobic compost bed;
 d) removing filtered wastewater from the aerobic compost bed;
 e) applying the removed filtered wastewater to a feed side of a membrane filter;
 f) withdrawing treated wastewater from a filtrate side of said membrane filter.

Preferably, the method further includes the step of periodically backwashing the membrane filter by flowing treated wastewater back through the membrane filter from the filtrate side to the feed side. For preference the backwash step includes feeding backwash waste to the aerobic compost bed.

It will be appreciated by those in the art that a number of variations of the valve control described may be used to achieve the desired results. Further, any form of membrane filter device suitable for the application described may be used, including pressurized and non-pressurised systems. Further, any form of biological treatment process, such as aerated bio-filters or domestic wastewater treatment processes, may be used to treat the wastewater prior to the membrane filtration step. The liquid backwash described may be further improved by the use of gas scrubbing and chemical cleaning processes in conjunction therewith.

BRIEF DESCRIPTION OF THE DRAWINGS

Preferred embodiments of the invention will now be described, by way of example only, with reference to the accompanying drawings in which.

DESCRIPTION OF PREFERRED EMBODIMENTS

Figure 1:
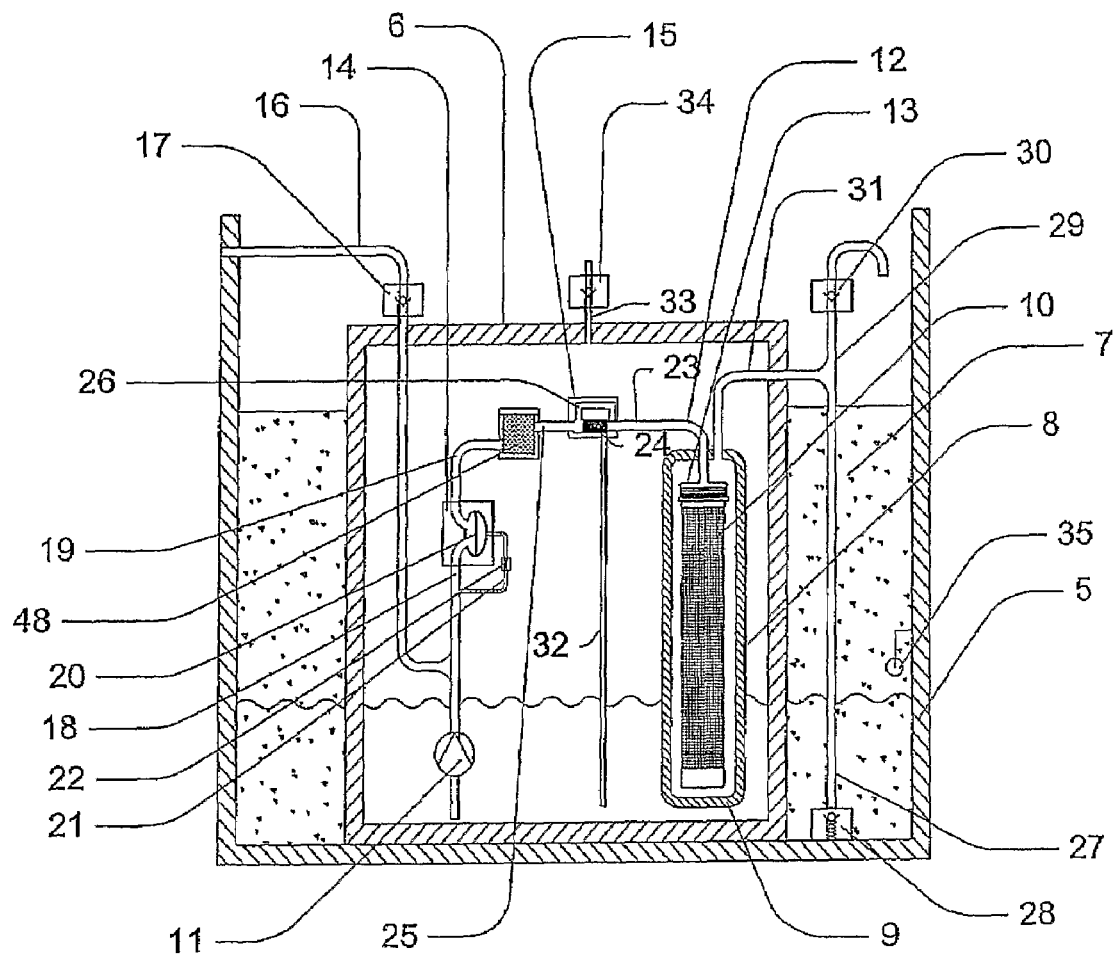
FIG. 1 shows a schematic cross-sectional view of the filtration system according to one embodiment of the invention for operation under suction.

Referring to FIG. 1 of the drawings, one embodiment is shown of the invention where the filtration system is operated under suction. The arrangement includes a feed tank 5 having a smaller filtrate vessel 6 positioned therein. The region within the feed tank 5 not occupied by the filtrate vessel 6 is partially filled with layers of decomposing and decomposed solid organic waste material to form an aerobic filter bed 7 of the type used in biolytic filtration as described above. A further module vessel 8 is mounted within the filtrate vessel 6 to form a membrane chamber 9 containing a membrane filtration module 10.

In this embodiment, a filtrate pump 11 is provided on the filtrate side of the membrane filtration module 10 in the filtrate vessel 6. The output side of filtrate pump 11 is coupled through a filtrate line 12 for fluid communication with the filtrate collection chamber 13 of the filtration module 10 via a filtrate diaphragm valve 14 and slider valve 15, respectively. The output side of the filtrate pump 11 is further coupled to an output line 16 through a non-return valve 17 for outputting treated filtrate from the system. The input side of the filtrate pump 11 is coupled directly to the filtrate vessel 6.

The filtrate diaphragm valve 14 has an input port 18 coupled to the filtrate pump 11 and an output port 19 coupled to a port of the slider valve 15 as described below. The diaphragm 20 is controlled by control line 21 connected to the filtrate-pump-side of the filtrate diaphragm valve 14 via a flow control valve 22.

The slider valve 15 has first and second ports 23 and 25 coupled to the filtration module 10 and the output port 19 of the filtrate diaphragm valve 14, respectively. A third port 24 is coupled directly to the filtrate vessel 6 by an output line 32. In a first, bypass position of the valve, fluid is fed from the first port 25 via a bypass line 26 to the second port 23. In a second, open position, the bypass line 26 is closed and fluid is fed from the first port 23 to the third port 24 to allow fluid flow through line 32.

The feed side of the filtration module 10 is coupled for fluid communication with the filter bed 7 through a feed line 27 connected to a foot valve 28 positioned at or adjacent the base of the filter bed 7. The feed line 27 is further connected to a backwash line 29 which opens above the filter bed 7 through a non-return valve 30 for preventing ingress of air.

The membrane vessel 8 is provided with an air vent line 31 connected to the upper portion of the chamber 9 and to the backwash line 29 to vent to the atmosphere via the non-return valve 30. In an alternative embodiment, the vent line 31 vents directly to the atmosphere via a dedicated manual vent valve (not shown). The backwash line 29 and the non-return valve 30 also serve to allow backwash fluid to exit onto the filter bed 7. The filtrate vessel 6 is similarly provided with an air vent line 33 connected to the upper portion of the vessel and to atmosphere via air vent valve 34.

A level switch 35 is provided in the filter bed 7 above the level of the foot valve 28 to detect liquid level within the filter bed 7.

Figure 2:
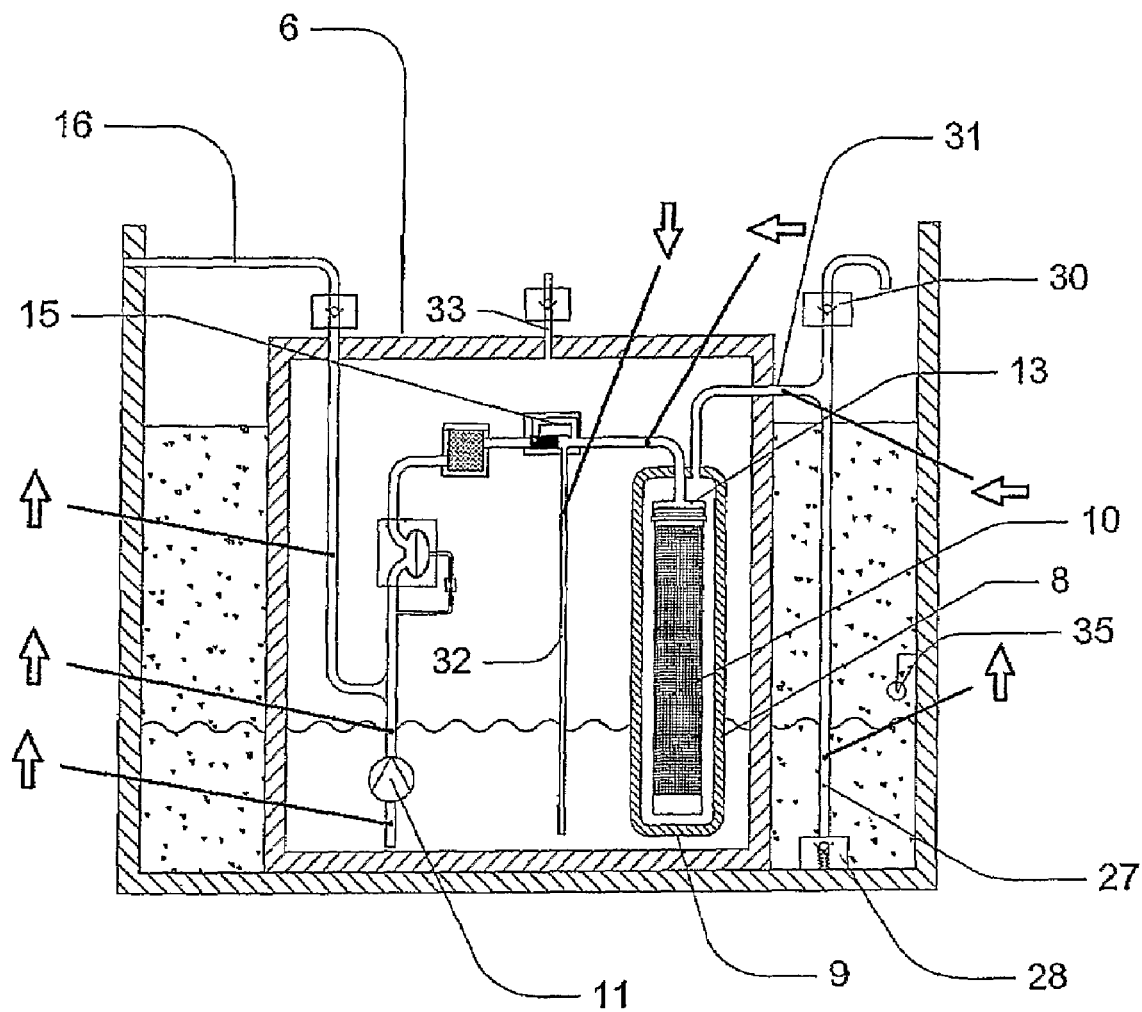
FIG. 2 shows a schematic cross-sectional view of the filtration system of FIG. 1 in filtration mode.

As shown in FIG. 2, during the filtration operation, treated filtrate, typically water, is pumped by the filtrate pump 11 from the filtrate vessel 6 through output line 16, which reduces the pressure in the filtrate vessel 6 and causes filtrate to be drawn-through the membranes in the membrane module 10 via feed line 27 and the foot valve 28. With the slider valve 15 in an open, non-bypass position, filtrate passes through the membrane module 10 and filtrate collection chamber 13 and is discharged via the third port 24 in the slider valve 15 into the filtrate vessel 6 via line 32. The level switch 35 in the filter bed 7 controls the operation of the filtrate pump 11 and ensures the foot valve 28 remains submerged so as not to draw air into the membrane chamber 9.

At start up and periodically during backwash, air that is in the membrane chamber 9 is vented through the vent line 31 and non-return valve 30 to ensure that the membrane module 10 is always submerged in feed liquid.

Once the liquid level on the feed side has dropped to a lower level switch point, the filtrate pump 11 is stopped and does not restart until the feed liquid level has risen again and triggered a high level switch. While the filtrate pump 11 is off, the liquid level in the filtrate vessel 6 is slowly replenished by the hydraulic level difference between the filtrate in the filtrate vessel 6 and the feed liquid in the filter bed 7, via the third port 24 of the slider valve 15 and the slider valve output line 32. As this occurs, air in the filtrate vessel 6 is displaced via the air vent valve 33 at the top of the filtrate vessel 6 and the liquid level rises again to the normal operating level.

Figure 3:
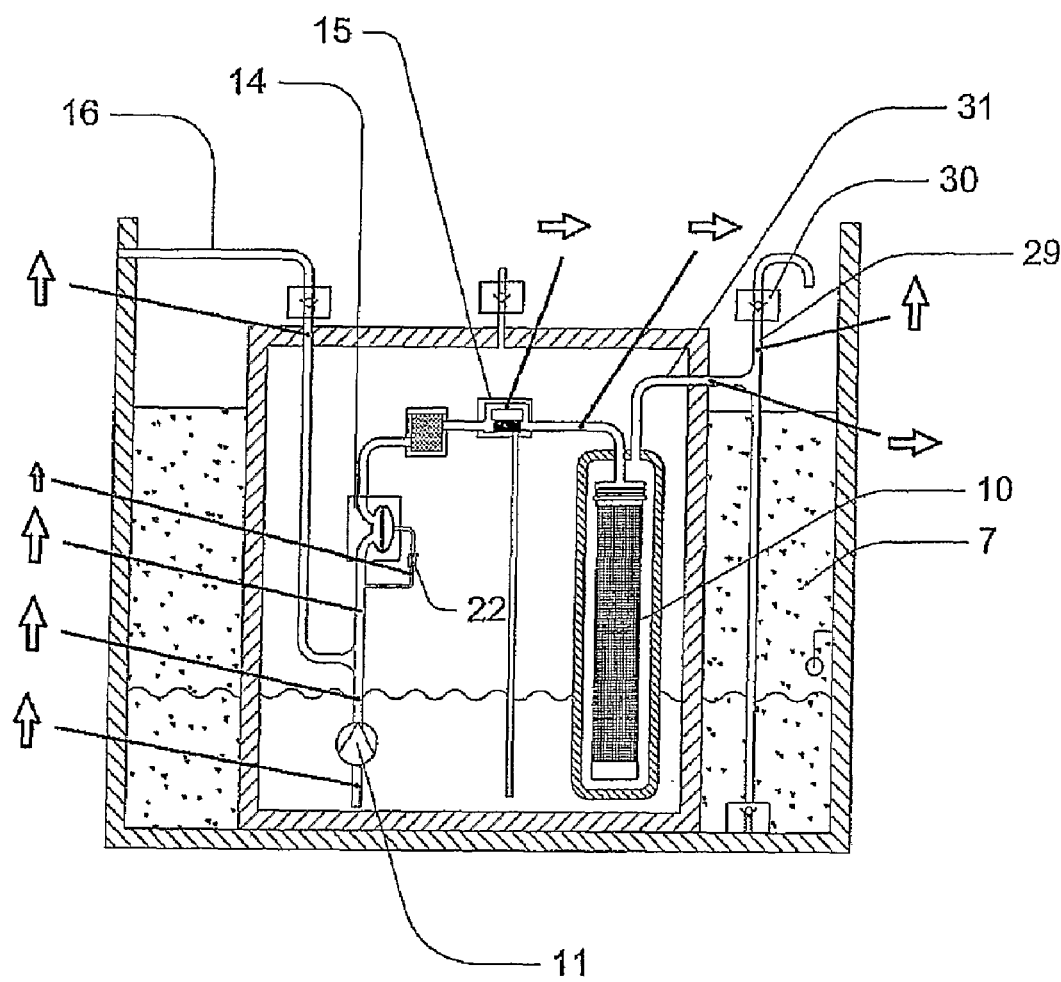
FIG. 3 shows a schematic cross-sectional view of the filtration system of FIG. 1 in backwash mode.

As shown in FIG. 3, when the level in the filter bed 7 rises again and the filtrate pump 11 starts, the filtrate diaphragm valve 14 (now open as the pressure has been released from the valve with the filtrate pump stopped) allows filtrate to flow back to the membrane module 10 via the slider valve 15 which moves to a bypass position. The backflow of filtrate flushes dirt from the surface of the membrane module 10 and from between the membranes and discharges it back on to the filter bed 7 via the backwash line 29 and non-return valve 30. As the filtrate pump 11 runs, the small flow control valve 22 slowly re-pressurises the filtrate diaphragm valve 14 and closes the valve, redirecting the filtrate flow to the output line 16 and opening the slider valve 15 again. In this way, every time the filtrate pump 11 starts, an automatic backwash of the membrane module 10 is accomplished, the duration of which is controlled by the bleed flow in the flow control valve 22. This can be as simple as an irrigation dripper valve or small bore line and is typically selected to provide about 1 minute of flow before closing the filtrate diaphragm valve 14.

Figure 4:
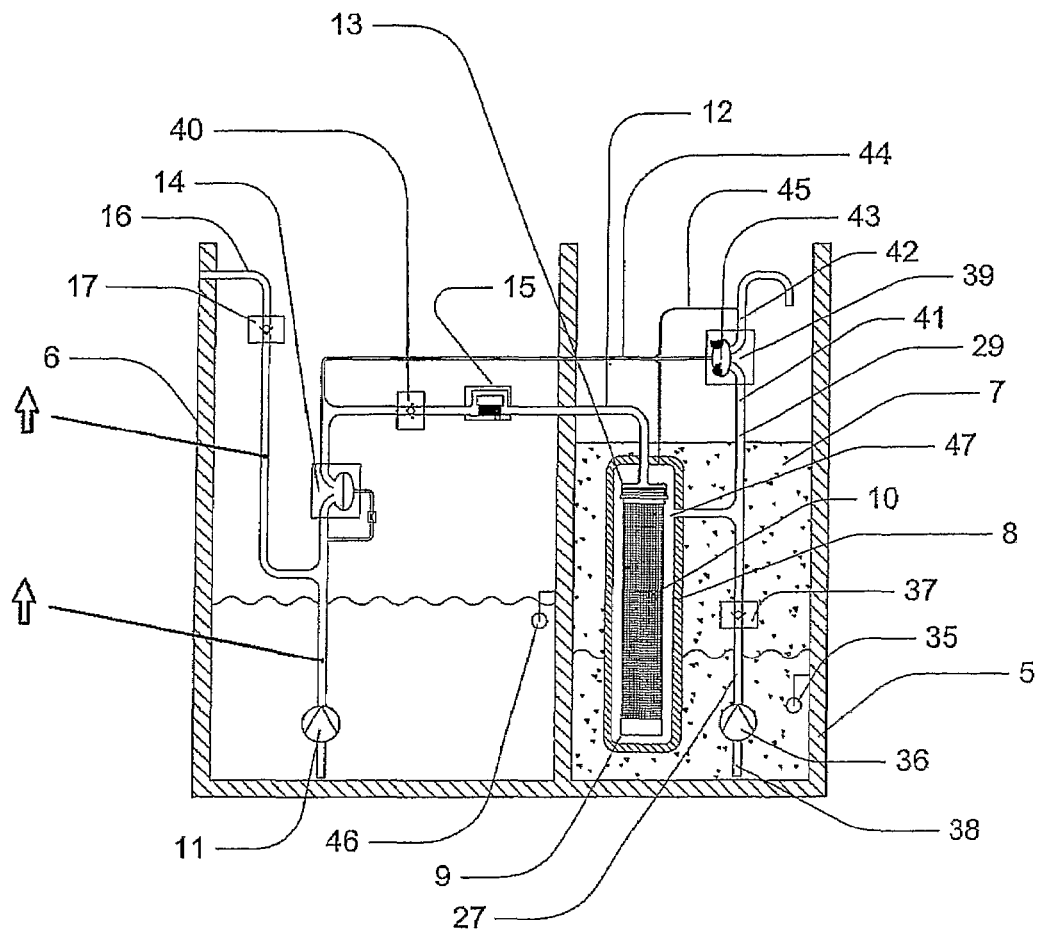
FIG. 4 shows a schematic cross-sectional view of the filtration system according to one embodiment of the invention for operation in on-demand mode.
Figure 5:
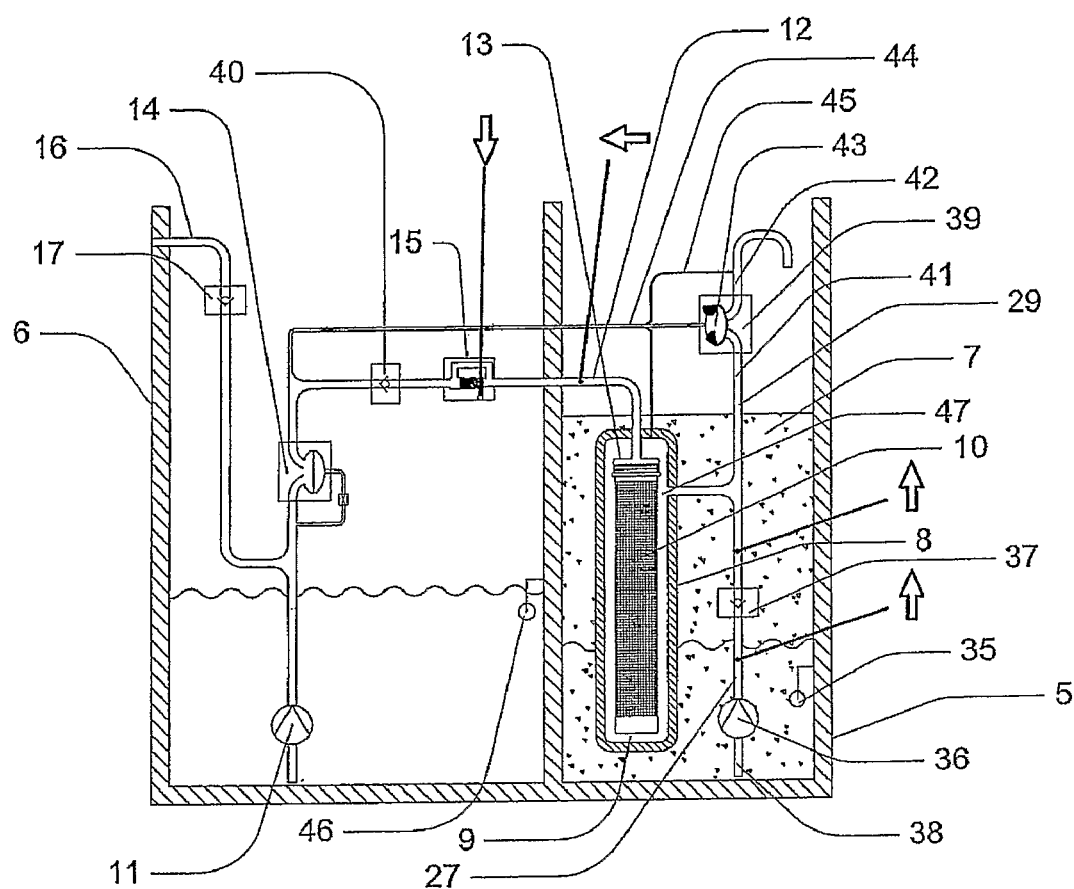
FIG. 5 shows a schematic cross-sectional view of the filtration system of FIG. 4 in filtration mode.
Figure 6:
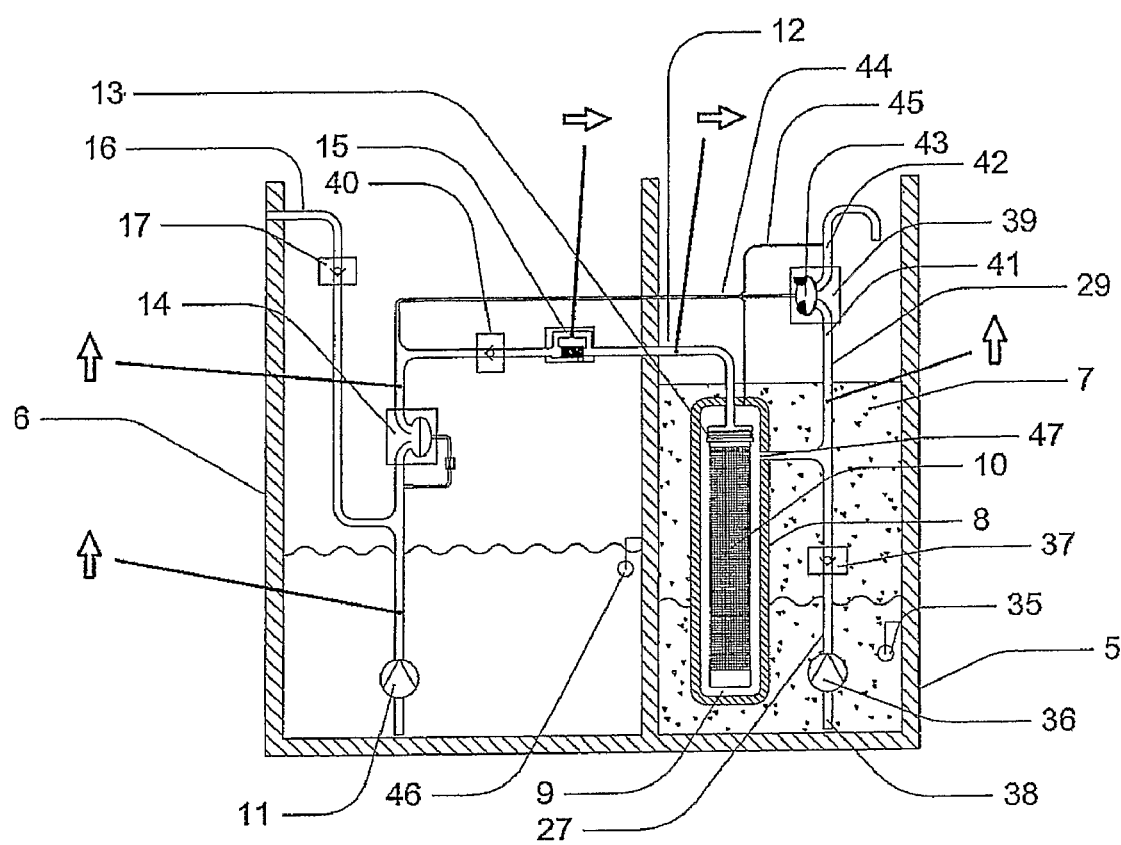
FIG. 6 shows a schematic cross-sectional view of the filtration system of FIG. 4 in backwash mode.

A further embodiment of the invention is a demand mode arrangement shown in FIGS. 4 to 6. Referring to FIG. 4, in this embodiment the filtrate vessel 6 and feed tank 5 are provided side by side with the feed tank 5 again partially filled with layers of decomposing and decomposed solid organic waste material to form a filter bed 7 of the type used in biolytic filtration as described above.

In this embodiment, the module vessel 8 is mounted within the feed vessel 5 and filter bed 7 to form a membrane chamber 9 containing the membrane filtration module 10. A feed line 27 is coupled to a feed pump 36 via a non-return valve 37. The feed pump 36 has an inlet 38 positioned adjacent the base of the filter bed 7. The feed line 27 is further connected to a backwash line 29 through backwash diaphragm valve 39.

A filtrate pump 11 is again provided on the filtrate side of the membrane filtration module 10 in the filtrate vessel 6. The output side of filtrate pump 11 is coupled for fluid communication with the filtrate collection chamber 13 of the filtration module 10 through a filtrate line 12 via a filtrate diaphragm valve 14, non-return valve 40 and slider valve 15, respectively. The output side of the filtrate pump 11 is further coupled to an output line 16 through a non-return valve 17 for outputting treated filtrate from the system. The input side of the filtrate pump 11 is coupled directly to the filtrate vessel 6.

The backwash diaphragm valve 39 has an input port 41 and an output port 42. The diaphragm 43 is controlled by control line 44 connected to filtrate line 12 between the filtrate diaphragm valve 14 and the non-return valve 40.

A small air bleed line 45 is provided between the top of the module vessel 8 and the backwash line 30.

A filtrate level switch 46 and feed level switch 35 are provided in the filtrate vessel 6 and feed tank 5 respectively to control liquid levels therein.

Unlike the suction mode arrangement, in the demand mode of this embodiment, the membrane module 10 is operated under positive pressure with a feed pump 36 upstream of the membrane module 10. In this case during filtration the feed pump 36 is running and pushes the feed through the membranes in the membrane module 10 and into the filtrate vessel 6 via the slider valve 15. The bleed line 45 at the top of the membrane vessel 8 ensures that any air in the membrane chamber 9 is vented back on to the filter bed 7. To ensure a net forward flow of filtrate through the system when there is no further air in the membrane chamber 9, the flow through this bleed line 45 is small in relation to the forward filtration flow. As filtrate is required, the filtrate pump 11 will start and draw filtrate from the filtrate vessel 6 for use.

Similarly to the first embodiment, as the filtrate pump 11 starts, filtrate will flow back to the membrane module 10 via the filtrate diaphragm valve 14 (now open as the bleed control valve has vented), through the slider valve 15 and the membrane module 10, and discharge via the now open backwash diaphragm valve 39, back on to the filter bed 7. Again, the duration of the backwash is determined by the selection of the flow control valve back to the filtrate diaphragm valve 14. After a suitable time (usually about 60 seconds), the filtrate diaphragm valve 14 closes, which depressurises the backwash diaphragm valve 39 allowing it to close, and filtrate is again supplied via the filtrate output line 16.

Figure 7:
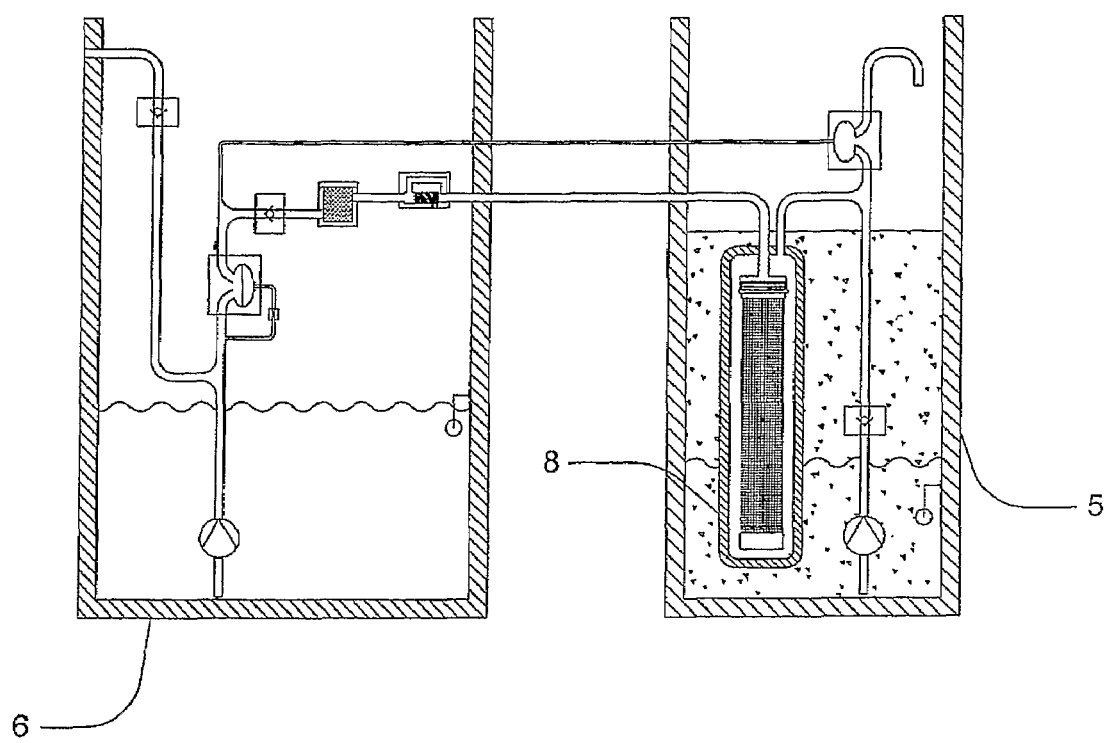
FIG. 7 shows an alternative arrangement for operation in on-demand mode.
Figure 8:
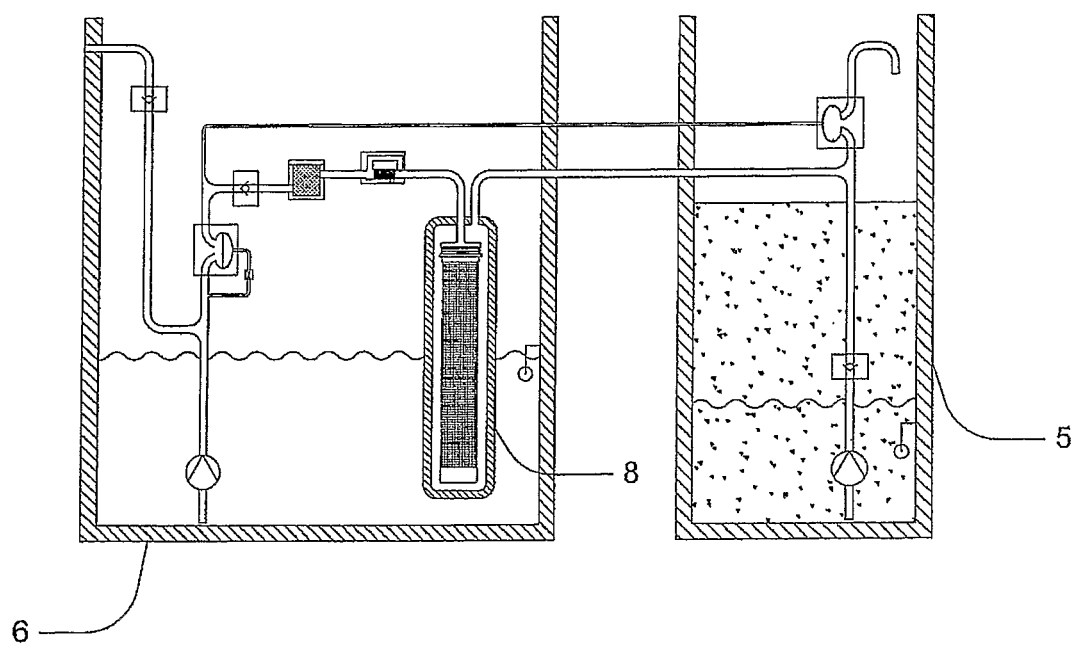
FIG. 8 shows a further alternative arrangement for operation in on-demand mode.
Figure 9:
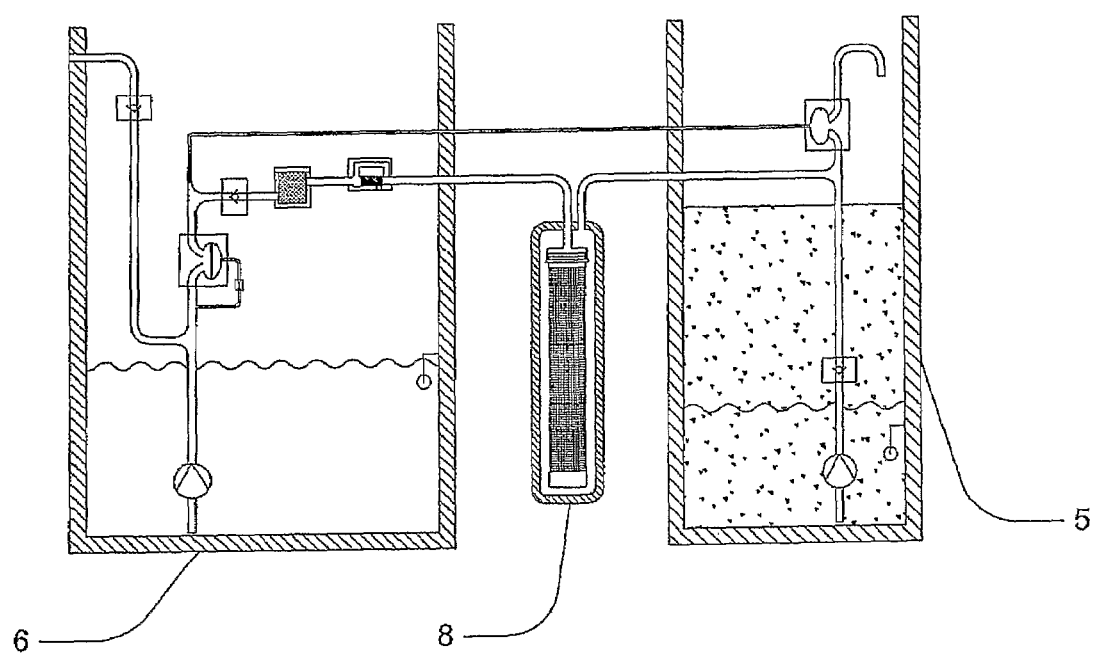
FIG. 9 shows yet a further alternative arrangement for operation in on-demand mode.

In the demand mode arrangement shown in FIGS. 4 to 6, the feed tank 5 and the filtrate chamber 6 are provided adjacent one another. FIG. 7 shows an alternative arrangement in which the feed tank 5 is remote from the filtrate chamber 6. FIG. 8 shows a further arrangement in which the feed tank 5 and the filtrate chamber 6 are remote from one another. However, in this arrangement, the module vessel 8 is located within the filtrate chamber 6. In yet a further arrangement shown in FIG. 9, the feed tank 5, the filtrate chamber 6 and the module vessel 8 are all provided remote from one another. The appropriate arrangement for a particular installation may be selected based on constraints relating to the space available and maintenance requirements. The arrangements shown in FIGS. 7 to 10 are operated in a manner analogous to that described in relation to the arrangement shown in FIGS. 4 to 6.

Figure 10:
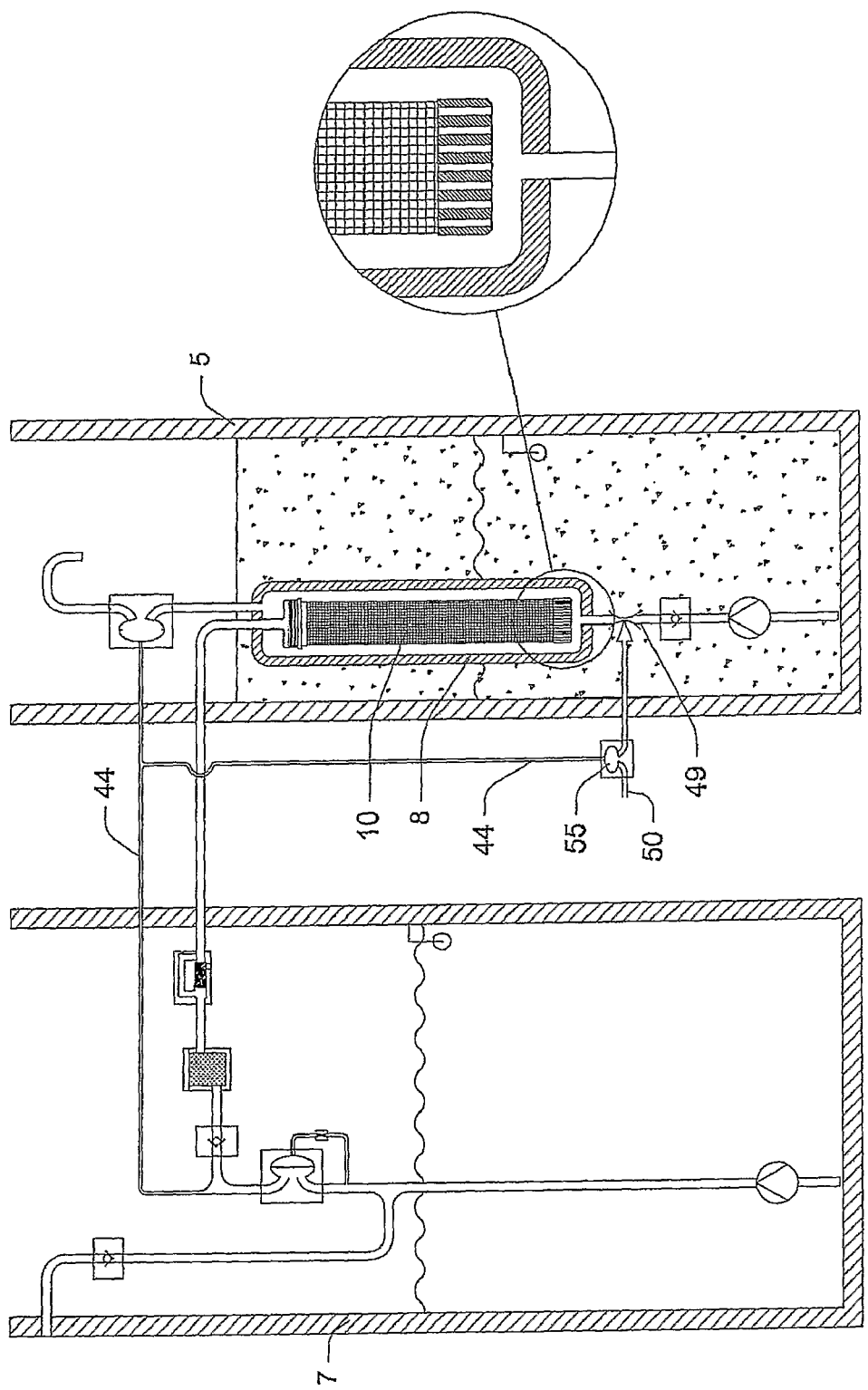
FIG. 10 shows a schematic cross-sectional view of a further arrangement including a gas supply for gas scouring of the membrane module.

FIG. 10 shows another embodiment in which the membrane module is located in the feed tank, which is remote from the filtrate chamber. In this arrangement, a venturi or eductor 49 is fitted to the discharge of feed pump. The feed inlet 47 to the membrane module 10 is moved to the bottom of the module vessel 8 and a membrane module 10 with suitable openings for gas scouring is fitted. For example, a module such as that described in U.S. Pat. Nos. 6,156,200, 6,555,005 or U.S. Pat. No. 6,841,070 may be used. The gas line 50 supplying the eductor 49 is actuated via a gas supply diaphragm valve 55 using the same bleed line 44 arrangement as for the filtrate and backwash diaphragm valves, such that the gas line only opens during the backwash process. This allows a flush of gas, typically air, to occur at the same time as the liquid backwash and result in an improved backwash and solids removal step.

In yet another embodiment, a small vessel 48 containing chlorine tablets is inserted in the backwash line of FIG. 1, between the filtrate diaphragm valve 14 and the slider valve 15. This vessel allows the slow dissolution of chlorine into the liquid in the chlorine vessel. When the filtrate pump 11 starts and backwash occurs, the filtrate that is pushed back through the membrane will contain chlorine. This assists in the backwash process and helps to keep the membrane clean and disinfected. Similarly, the same arrangement may be applied to chlorinate the filtrate leaving the membrane module 10 in either suction mode (FIG. 1) or demand mode (FIG. 4), by installing the chlorine chamber in the filtrate line leaving the membrane module 10. In this latter arrangement, all filtrate is chlorinated upon leaving the membrane module before entering the filtrate chamber 6.

Figure 11:
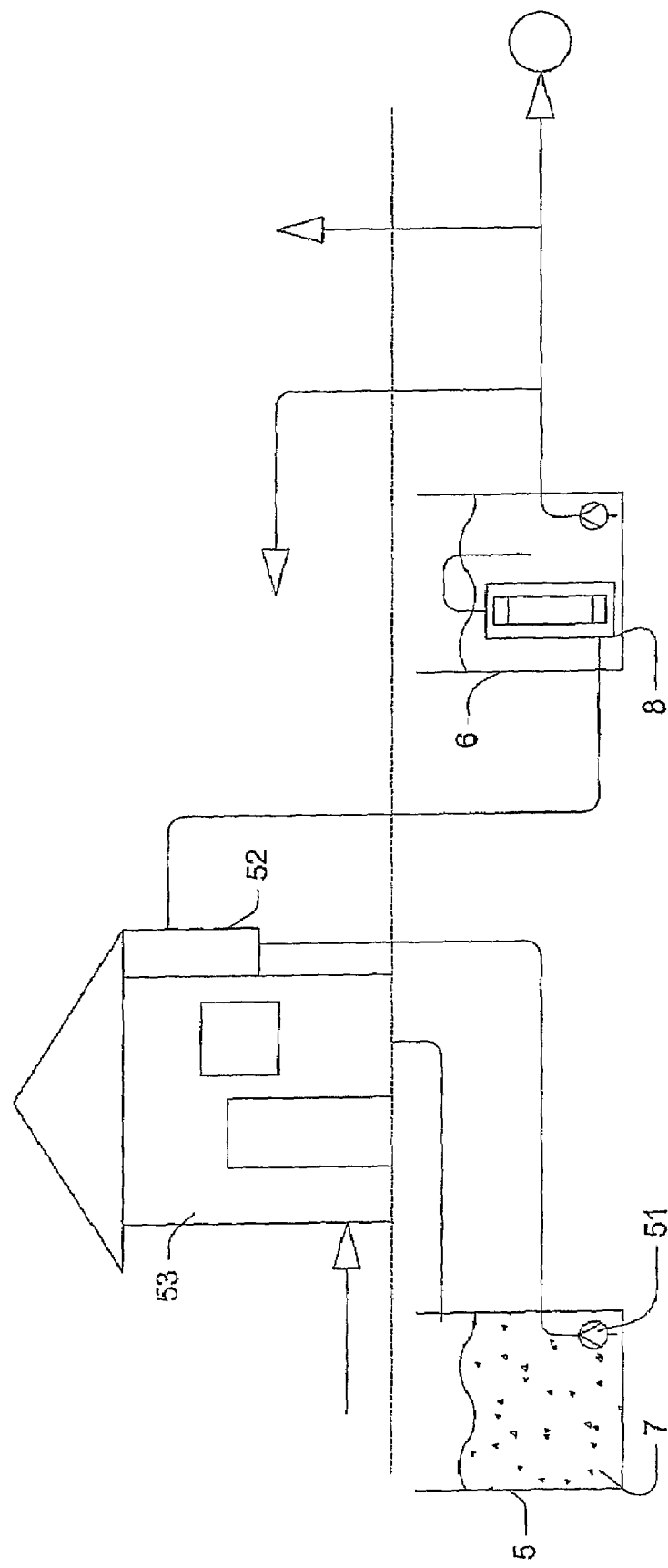
FIG. 11 shows a schematic view of a first gravity feed arrangement.

FIG. 11 shows a first gravity feed arrangement in which water to be treated is fed to a feed tank 5 having layers of decomposing and decomposed solid organic waste material to form an aerobic filter bed 7 as described above. A feed pump 51 pumps water from adjacent the base of the feed tank to a header tank 52 provided above the level of a filtrate chamber 6 containing a module vessel 8. For example, the header tank 52 may be located on the ground, with the filtrate chamber underground. For a higher header distance, the header tank 52 may be located on a wall of a building 53. Water is fed to the membrane module 10 located within the module vessel 8 and from there into the filtrate chamber 6. From the filter chamber, the treated water is pumped for reuse within the building 53 or in a garden. Surplus water may be routed to a storm drain.

Figure 12:
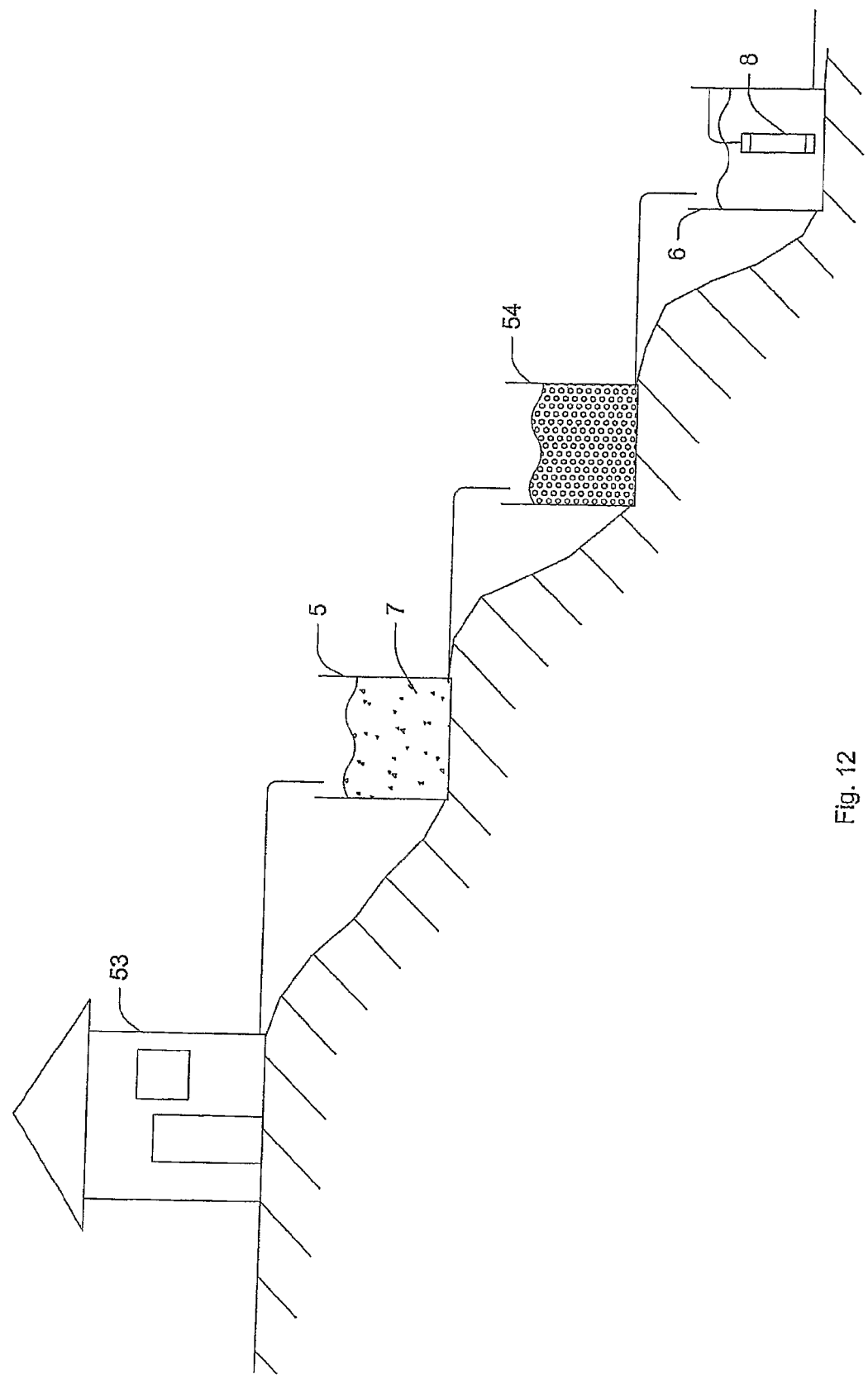
FIG. 12 shows a schematic view of a second gravity feed arrangement.

FIG. 12 shows a further gravity fed arrangement in which the feed tank 5 with filter bed 7 is located below the level of the building 53. Water is fed from adjacent the base of the feed tank 5 to a filter chamber 54 located below the level of the feed tank 5. The filter chamber 54 includes a carbon filter or other filter, for example for reduction of colour in the water. Water is further fed from adjacent the base of the filter chamber 54 to a filtrate chamber 6 via a module vessel 8 containing a membrane module 10 as described above. From the filtrate chamber, treated water may be drawn for reuse or passed to a storm drain.

Although the above embodiments are particularly described by reference to an aerobic compost bed, in other embodiments alternate biological treatment components are used in place of an aerobic compost bed. Examples of alternate biological treatment components include those typically used in post treatment stages such as compositing processes, aerated fixed film processes, and/or mixed liquor type processes with post settling.

It will be appreciated that further embodiments and exemplifications of the invention are possible without departing from the spirit or scope of the invention described. In particular features of the various described embodiments may be provided in various further combinations.

The invention claimed is:

1. A wastewater treatment system comprising:
    an aerobic compost bed;
    an inlet configured to supply wastewater to said aerobic compost bed;
    a membrane filter device including one or more hollow, permeable membranes including walls with feed sides and filtrate sides, the feed sides being in fluid communication with said aerobic compost bed;
    a pump coupled to said membrane filter device, said pump being selectively operable to provide a filtration operation by producing a pressure differential across the walls of said membranes to cause flow of feed liquid from the aerobic compost bed to the feed sides of the membrane walls and withdrawal of filtrate liquid from the filtrate sides of said membrane walls; and
    a pressure responsive valve in fluid communication with said pump, and configured to reverse the pressure differential applied to said membranes walls and to close in response to fluid pressure being applied to a control port.

2. The system according to claim 1, further including a filtrate vessel for receiving filtrate liquid withdrawn from the filtrate sides of said membranes.

3. The system according to claim 2, wherein the filtrate vessel is closed and the pump is operable to withdraw filtrate therefrom such that said withdrawal produces said pressure differential across said membranes walls.

4. The system according to claim 3, wherein the filtrate vessel is selectively closed by a gas stop valve, the gas stop valve being configured to allow gas to be vented from the filtrate vessel and configured to prevent entry of gas into the filtrate vessel.

5. The system according to claim 1, wherein an inlet of the pressure responsive valve is connected to an outlet of said pump, an outlet of the pressure responsive valve is coupled to said membrane filter device, and the control port is coupled to the outlet of said pump.

6. The system according to claim 5, further comprising a directional control valve having a first port, a second port, and an outlet port, wherein the directional control valve is configured to allow fluid flow from the first port to the outlet port while closing the second port responsive to a fluid pressure at the first port being higher than a fluid pressure at the second port and being configured to allow fluid flow from the second port to the first port while closing the outlet port responsive to the fluid pressure at the second port being higher than the fluid pressure at the first port.

7. The system according to claim 6, wherein the directional control valve is positioned between the pressure responsive valve and the membrane filter device, the outlet of the pressure responsive valve being connected to the second port, the membrane filter device being connected to the first port, and the outlet port being in fluid communication with the filtrate vessel.

8. The system according to claim 1, wherein the pump is operable to provide feed liquid under pressure to the feed sides of said membranes, the provision of the feed liquid under pressure to the feed sides of said membranes producing said pressure differential across the membrane walls.

9. The system according to claim 8, further comprising a further pump, the further pump configured to flow filtrate liquid from the filtrate sides of the membrane wall to the feed sides of the membrane wall, the flow of the filtrate liquid from the filtrate sides of the membrane wall to the feed sides of the membrane wall reversing the pressure differential applied to said membrane walls and effecting a backwash of the membranes.

10. The system according to claim 1, wherein the aerobic compost bed is formed in a feed vessel and said membrane filter device is in fluid communication with an inlet at or adjacent a base of said feed vessel.

11. The system according to claim 10, wherein said feed vessel includes a fluid level detection device configured to control the operation of said pump dependent on a level of liquid in said feed vessel.

12. The system according to claim 11, wherein said fluid level detection device is configured to disable the pump when the liquid level falls below a first predetermined limit, and to enable the pump when the liquid level rises to a second predetermined limit.

13. The system according to claim 12, wherein the first predetermined limit and second predetermined limit are the same.

14. The system according to claim 12 wherein the first predetermined limit is selected such that the inlet at or adjacent the base of the feed vessel remains immersed in liquid.

15. The system according to claim 10 wherein the inlet includes a foot valve.

16. A method of treating wastewater comprising:
    forming and maintaining an aerobic compost bed in a feed vessel;
    feeding wastewater onto the aerobic compost bed;
    causing said wastewater to filter through the aerobic compost bed; controlling operation of a pump with a fluid level switch located in the feed vessel;
    removing filtered wastewater from the aerobic compost bed with the pump;
    applying the removed filtered wastewater to a feed side of a membrane filter; and
    withdrawing treated wastewater from a filtrate side of said membrane filter.

17. The method according to claim 16 further including the step of periodically backwashing the membrane filter by flowing treated wastewater back through the membrane filter from the filtrate side to the feed side.

18. The method according to claim 17 wherein the backwash step includes feeding backwash waste to the aerobic compost bed.

19. A method of operating a wastewater treatment system comprising:
    providing a wastewater treatment system comprising a pressure responsive valve;
    dropping a fluid pressure within a filtrate vessel during a filtration operation;
    closing the pressure responsive valve during the filtration operation, the closing of the pressure responsive valve causing a fluid pressure at a first port of a directional control valve to exceed a fluid pressure at a second port of the directional control valve as the fluid pressure within the filtrate vessel drops;
    flowing filtrate from a membrane filter device comprising one or more hollow, permeable membranes including walls having feed sides in fluid communication with an aerobic compost bed through the first port of the directional control valve and an outlet port of the directional control valve and into the filtrate vessel;
    disabling a fluid pump when a feed liquid level in the aerobic compost bed falls below a first predetermined level;
    releasing pressure from the pressure responsive valve in response to the disabling of the pump, the release of the pressure opening the pressure responsive valve;
    enabling the fluid pump when the feed liquid level within the aerobic compost bed rises above a second predetermined level; and
    applying a fluid pressure to the second port of the directional control valve which exceeds the pressure at the first port of the directional control valve in response to the enabling of the fluid pump, the application of the fluid pressure to the second port of the directional control valve causing the outlet port of the directional control valve to close and filtrate liquid to flow to filtrate sides of the membranes of the membrane filter device from the filtrate vessel through the second and first ports of the directional control valve.

20. The method of claim 19, further comprising backwashing the membranes of the membrane filter device by passing filtrate liquid through the membrane filter from the filtrate side to the feed side.

21. The method of claim 19, wherein flowing filtrate liquid to filtrate sides of the membranes of the membrane filter device from the filtrate vessel further comprises adding chlorine to the filtrate liquid flowed to the filtrate sides of the membranes of the membrane filter device from the filtrate vessel.

* * * * *